(12) United States Patent
Babington

(10) Patent No.: US 6,474,287 B2
(45) Date of Patent: *Nov. 5, 2002

(54) RECIPROCATING MECHANISM AND ENGINE INCLUDING THE SAME

(75) Inventor: Alan Roger Babington, 7-8 Frobisher House, 89 Lilley Road, London SW6 1UD (GB)

(73) Assignee: Alan Roger Babington, London (GB)

( * ) Notice: Subject to any disclaimer, the term of this patent is extended or adjusted under 35 U.S.C. 154(b) by 24 days.

This patent is subject to a terminal disclaimer.

(21) Appl. No.: 10/015,827

(22) Filed: Dec. 10, 2001

(65) Prior Publication Data

US 2002/0043225 A1 Apr. 18, 2002

Related U.S. Application Data

(63) Continuation of application No. 09/720,387, filed as application No. PCT/GB99/02027 on Dec. 20, 2000.

(30) Foreign Application Priority Data

Jun. 26, 1998 (GB) .............................................. 9813710
Jan. 8, 1999 (GB) .............................................. 9900247

(51) Int. Cl.$^7$ ............................ F16H 21/34; F01B 9/04; F02B 75/24
(52) U.S. Cl. ............................... 123/197.1; 123/197 A; 74/25
(58) Field of Search .......................... 123/197.1, 197.2, 123/197.3, 197.4; 74/25

(56) References Cited

U.S. PATENT DOCUMENTS

| | | | | |
|---|---|---|---|---|
| 3,998,200 A | * | 12/1976 | Sudholt | 123/197.1 |
| 4,301,776 A | * | 11/1981 | Fleming | 123/197.4 |
| 4,459,945 A | * | 7/1984 | Chatfield | 123/197.1 |
| 5,216,927 A | | 6/1993 | Mandelia | |
| 5,529,029 A | * | 6/1996 | Rowe et al. | 123/197.1 |
| 5,673,665 A | | 10/1997 | Kim | |
| 5,836,234 A | | 11/1998 | Chen et al. | |

FOREIGN PATENT DOCUMENTS

| | | |
|---|---|---|
| DE | 3019288 | 11/1981 |
| FR | 733035 | 9/1932 |
| JP | 57168001 | 10/1982 |
| WO | WO 96/16282 | 5/1996 |
| WO | WO 97/24518 | 7/1997 |

OTHER PUBLICATIONS

Search report from the British Patent Office dated Dec. 1, 1999 for British Application GB 9900247.9 filed Jan. 8, 1999 (one of the priority documents for the above–identified National Phase PCT application).

International Search report dated Oct. 13, 1999 for PCT/GB99/02027, filed Jun. 28, 1999, the above–identified National Phase PCT application.

* cited by examiner

Primary Examiner—Marguerite McMahon
(74) Attorney, Agent, or Firm—Wood, Phillips, Katz, Clark & Mortimer

(57) ABSTRACT

A reciprocating mechanism for use in an engine comprises a reciprocating member which is movable in a substantially linear reciprocating direction between two ends of travel, a piston provided on the reciprocating member, and a constant breadth cam and follower, the follower being coupled directly to the reciprocating member to translate linear movement of the reciprocating member into rotary motion of the cam, and the mechanism being such that movement of the reciprocating member at the two ends of its travel is reversed in dependence upon the rotation of the cam, the follower lying to the side of the piston bore and the piston being rigidly mounted to the reciprocating member.

6 Claims, 6 Drawing Sheets

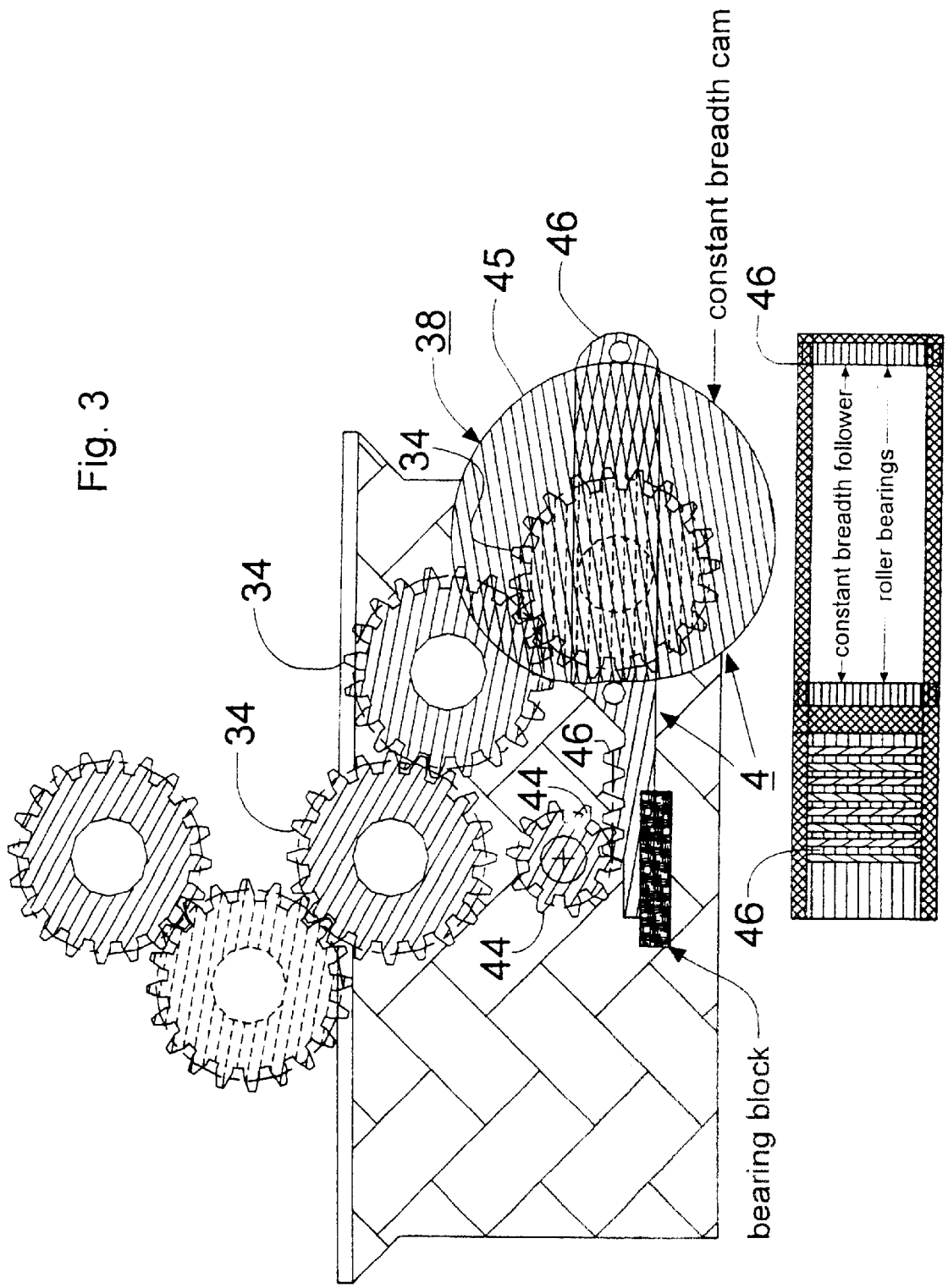

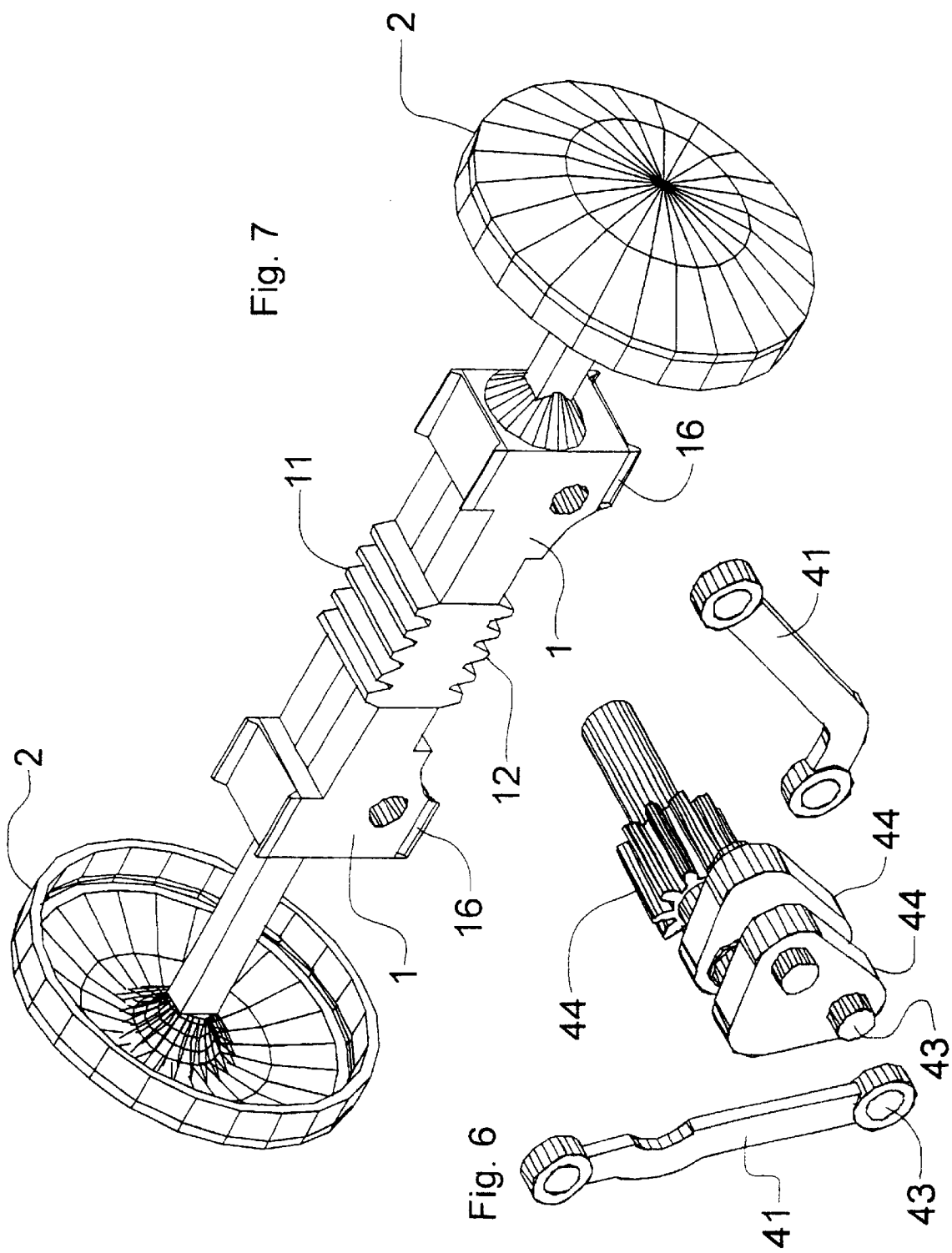

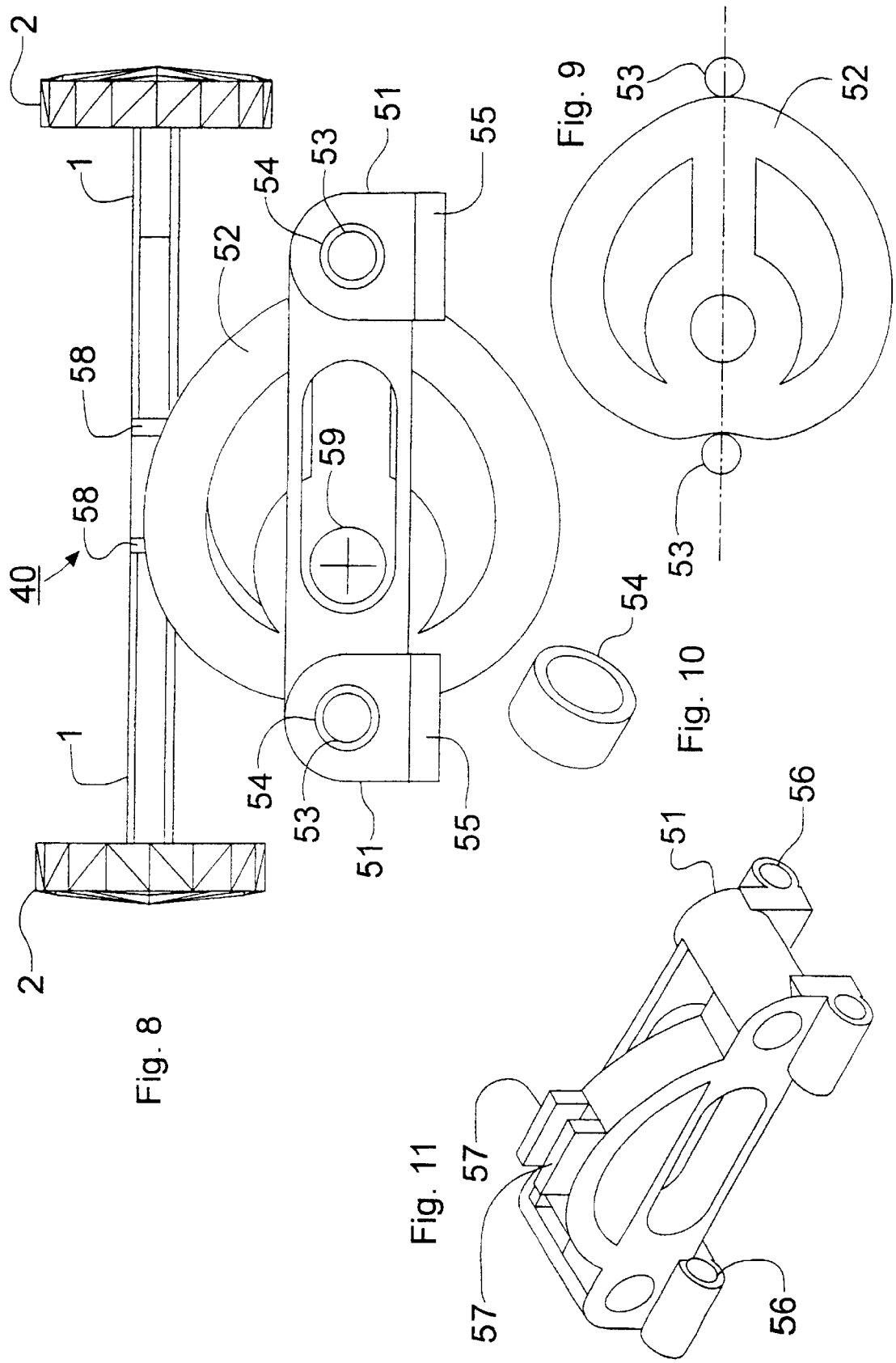

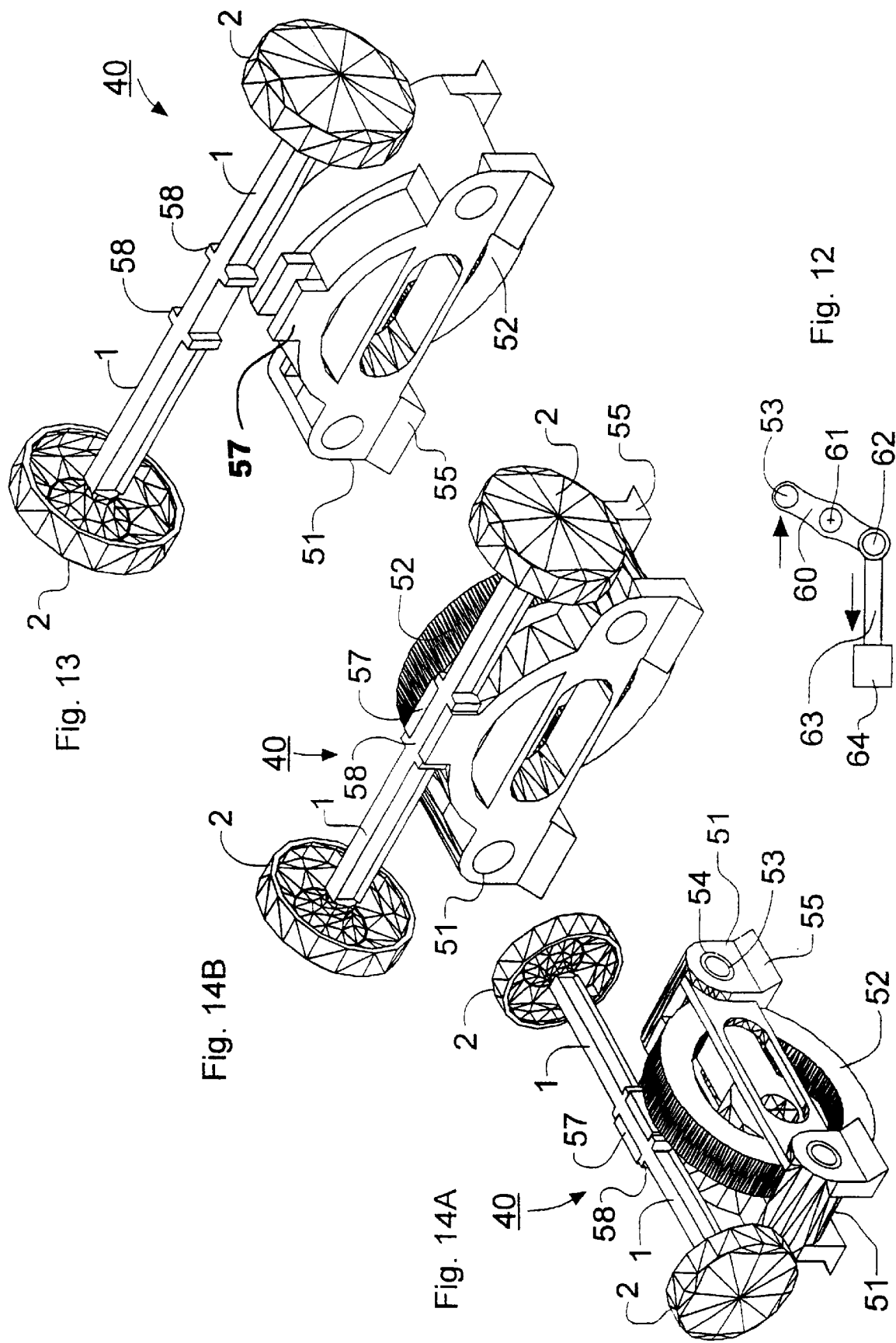

RECIPROCATING MECHANISM AND ENGINE INCLUDING THE SAME

This is a continuation application of U.S. patent application Ser. No. 09/720,387, filed Dec. 20, 2000, entitled "A RECIPROCATING MECHANISM AND ENGINE INCLUDING THE SAME", which claims the benefit of priority from previously filed International Application designating the United States of America, PCT/GB99/02027 having an international filing date of Jun. 28, 1999 and claiming priority based on GB Application Ser. No. 9813710.2, filed Jun. 26, 1998 and GB Application 9900247.9, filed Jan. 8, 1999.

FIELD OF THE INVENTION

The present invention relates to a reciprocating mechanism, and more particularly to an engine, such as an internal combustion engine, including such a mechanism.

DESCRIPTION OF THE PRIOR ART

Known reciprocating mechanisms include crank mechanisms and cam mechanisms. Internal combustion engines exclusively use crank mechanisms to translate their linear motion of a piston sliding up and down in a barrel into rotation of an output shaft.

BRIEF SUMMARY OF THE INVENTION

According to one aspect of the present invention, there is provided a reciprocating mechanism including a reciprocating member, movable in a substantially linear reciprocating direction between two ends of travel, a piston provided on the reciprocating member, and a constant breadth cam and follower, the follower being coupled directly to the reciprocating member to translate linear movement of the reciprocating member into rotary motion of the cam, and the mechanism being such that movement of the reciprocating member at the two ends of its travel is reversed in dependence upon the rotation of the said cam, wherein the follower lies to the side of the piston bore and the piston is rigidly mounted to the reciprocating member.

Preferably, the constant breadth cam and follower member are coupled to a pendulum counterbalance.

According to a second aspect of the present invention, there is provided an engine including the reciprocating mechanism of the first aspect of the invention.

A piston may be provided at each end of the reciprocating member.

BRIEF DESCRIPTION OF THE DRAWINGS

Reference will now be made, by way of example, to the accompanying drawings, in which:

FIG. 3 is a schematic diagram showing a rear end view of the gear mechanism and the return mechanism shown in FIGS. 1 and 2;

FIG. 6 shows a perspective view of the crank mechanism employed in the apparatus of FIGS. 1, 2 and 3;

FIG. 7 shows a perspective view of a reciprocating member embodying a gear rack of 11, 12 shown in FIGS. 1 and 2;

FIG. 8 shows a plan view of a constant breadth cam member, coupled directly to the reciprocating member;

FIG. 9 shows a plan view of a lightened constant breadth cam and its surface bearings;

FIG. 10 shows a bearing which supports the surface bearings of the cam to the follower member;

FIG. 11 shows a perspective view of the follower member with an alternative arrangement for bearing guides;

FIG. 12 shows a pendulum counterbalance;

FIG. 13 shows an exploded perspective view of the reciprocating member and the constant breadth cam member; and FIGS. 14A and 14B show respective perspective front and rear views of the combined reciprocating member and constant breadth cam member.

DETAILED DESCRIPTION OF THE INVENTION.

Figure 1:
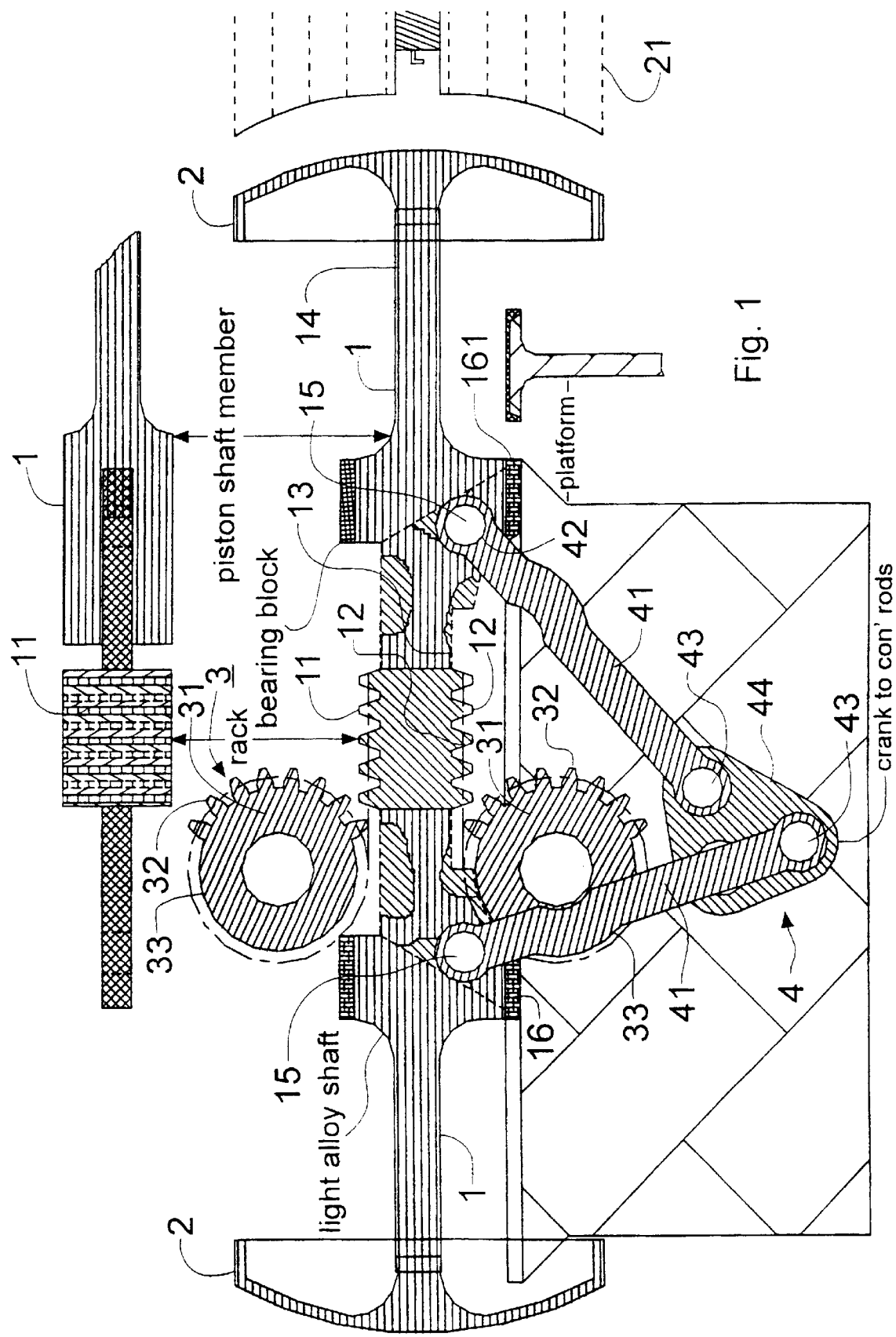
FIG. 1 shows a front end view, partially sectioned, of apparatus embodying the first and second aspects of the present invention.
Figure 2:
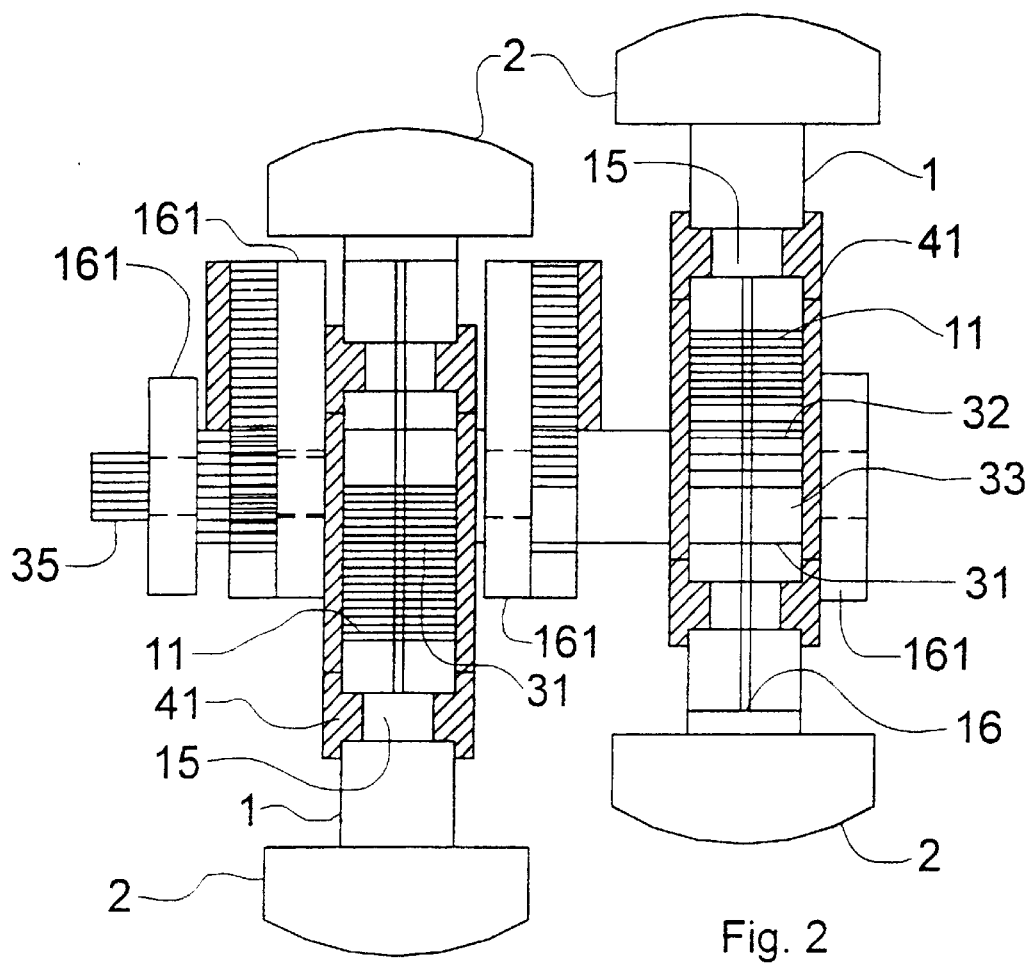
FIG. 2 shows a plan view of FIG. 1.

FIGS. 1, 2 and 3 show a reciprocating mechanism embodying the first aspect of the present invention employed in an internal combustion engine and including a reciprocating member 1, connected to two pistons 2, one at each end, rotary means 3 and reversing means 4.

The reciprocating member 1 is a shaft embodying a rack of gears 11,12 provided partially along its length on opposing longitudinal sides. Regions 13 which do not have any gear teeth are provided at each set of gear teeth. The reciprocating member 1 also includes means 15, such as a transverse hole or axle, for attaching the gear rack 11,12, and also for attaching a connecting rod of an adjacently disposed crank mechanism thereto. Bearing blocks 16 are provided on both sides of gears 11,12 to mount reciprocating member 1 slidably in a fixed linear path for movement between two ends of travel. The reciprocating member 1 is preferably made from a light alloy material and the rack 11,12 from a high strength material, the member 1 being made as light as possible. The pistons 2 are preferably connected rigidly to the reciprocating member 1, one at each end, and this may be by way of a screw thread or pin and clip.

Figure 4:
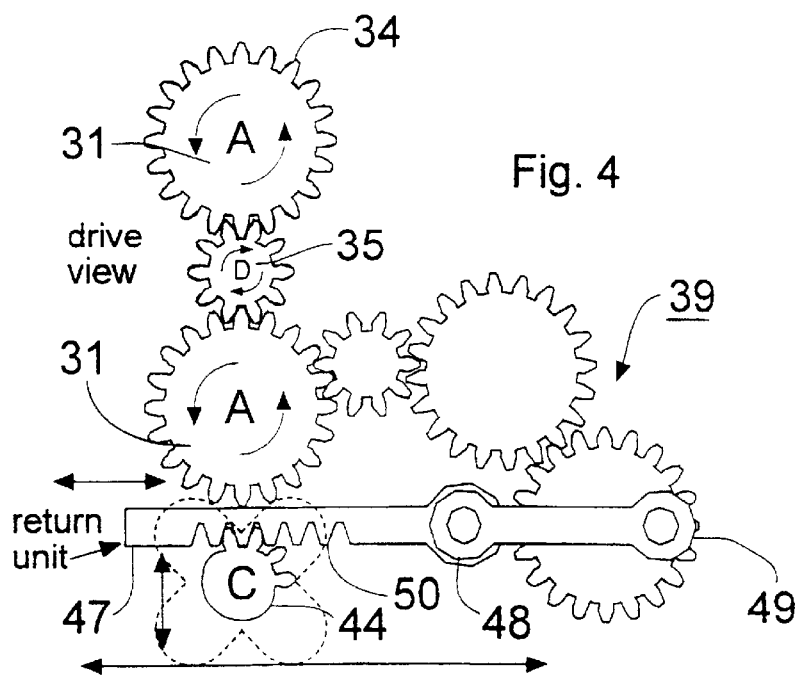
FIG. 4 shows an alternative embodiment of the return mechanism of FIG. 3.

The rotary means 3 comprises two gear wheels 31 which are coupled to each other to rotate in the same direction at substantially the same rate, that is at substantially the same angular velocity. These gears may be sprag clutch, ramp and roller type gears, which rotate in one direction and free wheel in the opposite direction, or they may be segmented gears as shown. Each segmented gear wheel 31 has a geared portion 32 and a non-geared portion 33. The geared portions 32 are arranged engageably to couple the gear teeth 11,12 of the reciprocating member 1, whilst the non-geared portions 33 are arranged not to engage with these gear teeth 11,12 at any time. Each gear wheel may have a bearing 161. As shown in FIG. 4, on the same axis of each gear wheel 31, behind or in front of each portion 32,33, gears 34 are provided which engage with each other via an intermediate gear disposed therebetween.

The geared and non-geared portions 32,33 of each gear wheel 31 are adapted to enable one gear wheel 31 to engage the reciprocating member 1 in one of its two directions of travel and to enable the other gear wheel 31 to engage the reciprocating member 1 in the opposite direction, whilst both gear wheels rotate together in the same sense.

Therefore, whilst one gear wheel 31 is arranged to engage its teeth 32 with teeth 11, for example, of the reciprocating member 1, the other wheel 31 rotates without engagement, with the non-geared portions 33 passing over the teeth 12. At the two ends of travel of the reciprocating member, the gear wheels 31 are both disengaged from teeth 11,12. This disengagement is necessary if the gear wheels 31 are to be able to rotate at constant angular velocity, whilst reciprocating member 1 almost instantaneously stops and reverses at each of its ends of travel. The sprag clutch and ramp and roller gears 31 may stay in engagement with gear teeth 11,12, as they will rotate in one direction of travel and free wheel around their axis on the return opposite direction of travel.

An intermediate gear wheel 35 provides an output for the mechanism and this may lead to a gear box (not shown). It may also be desirable to take the drive output from either of gear wheels 31, gear wheel 35 acting as an idler coupling gear wheel. Desirably, the intermediate gear wheel 35 and the gear wheels 31 rotate with substantially constant angular velocity. This may require the reciprocating member 1 to move with constant speed between substantially both ends of its travel, whilst changing very quickly its direction of travel and its speed at each end. To give the reciprocating member 1 more time to stop and accelerate at a lesser rate in the opposite direction at each end of travel to match the speed of. the rotating gear wheels 31, the gear wheels 31 may both be out of engagement with teeth 11,12 for a short distance of travel of the reciprocating member 1 at each end. To allow the reciprocating member 1 to have a non-constant speed, whilst giving a constant angular velocity output at gear wheel 35, the gear wheel 31 may have varying radii which co-operate with teeth 11, 12 which are configured accordingly. A larger radius, with constant gear wheel angular velocity, will allow the reciprocating member 1, arranged tangentially to the gear wheel, to travel faster. This is preferably near the middle of each stroke. Conversely, a smaller radius will allow the reciprocating member 1 to travel slower. This is preferably near the ends of its travel. The gear wheels employed in all cases, may of course, be helical gears which have high contact ratios.

Figure 5:
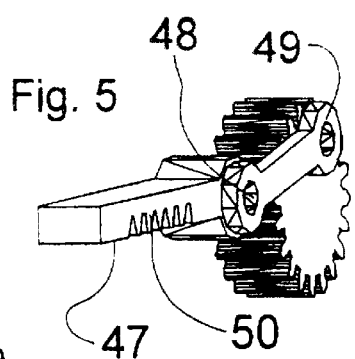
FIG. 5 shows a perspective view of details of the return mechanism of FIG. 4.

Reversing means 4 are shown in FIGS. 1 to 3 as one arrangement or in FIGS. 1, 4 and 5 as an alternative arrangement. In each case, the reversing means 4 includes two connecting rods 41, a central crank 44 with two crank arms, and a reciprocating mechanism 38 or 39 which is coupled to the central crank 44. Referring additionally to FIGS. 6 and 7, the connecting rods 41 are rotatably mounted at one of their ends 42 to the reciprocating member 1 at the said two locations 15 thereon and rotatably mounted to the crank 44 at their other ends 43. The crank arms are preferably arranged when the reciprocating member 1 is at either end of its travel as shown in FIG. 1, such that a respective connecting rod 41 extends between the centre of the crank axis and the locations 15 on the reciprocating member 1. In this way, the crank 44 and go 20 connecting rods 41 prevent the piston 2 and reciprocating member 1 from moving further than beyond the desired ends of travel and colliding with the cylinder head 21(only one shown) for each piston. The reversing means 4 is operable to stop and reverse the reciprocating member 1 at each. of its ends of travel. This is achieved by rotating the crank 44 from the position shown in FIG. 1, clockwise, to draw the reciprocating member 1 to the left so that the distance between the connecting rod and crank axis is made to reduce, at the same time as the reciprocating member 1 reaches its limit of travel.

FIG. 3 shows a mechanism 38 which causes the crank 44 to turn when the reciprocating member 1 nears the ends of its travel. The mechanism 38 comprises a displacement cam 45 (constant breadth cam shown), rack and follower member 46, which is coupled to the crank 44 via a rack and pinion joint 44 and 46. The surface of the cam 45 which is driven by coupled gear wheel 31 acts to displace the rack and constant breadth follower member 46, the displacement motion rotating crank pinion 44 into the desired synchronous rotation of the crank at each of the ends of travel of reciprocating member 1. A roller bearing may be provided at the contact point between the surface of the cam 45 and the rack and follower member 46.

FIGS. 4 and 5 show an alternative reciprocating mechanism 39. The mechanism 39 includes a further crank mechanism which couples the gear wheel 31 to the crank 44. As the gear wheel 31 rotates, reciprocating motion is imparted to a connecting rod member 47 which is provided with gear teeth 50. The thus generated reciprocal motion is synchronous with the desired rotation of the crank at each of the ends of travel of reciprocating member 1. The connecting rod member 47 is coupled to the crank via a rack and pinion joint 44,47.

An internal combustion engine employing one of the above reciprocating mechanisms may function with two or four stroke engine technology. Referring to FIG. 1 as a starting position, a two stroke embodiment of an engine functions as follows:

(I) both gear wheels 31 are rotating clockwise, combustion and explosion of fuel-air mixture causes the piston 2 and the reciprocating member 1 to accelerate to the left, aided by the clockwise rotation of the crank 44 and anti-clockwise rotation of the right-handside connecting rod 41 from top dead-centre position, both sets of gears 31,11,12 are disengaged from each other;

(II) the lower gear wheel 31 rotates with its non-geared portion moving under the leftwardly-moving teeth 12 of the reciprocating member 1, the upper gear wheel 31 now engages the teeth 11 of the reciprocating member 1, as it matches the tangential speed of its geared portion 32, the crank mechanism 41, 44 moves freely to allow the reciprocating member 1 to displace and ensures the teeth 11 mesh with gear teeth 32 of the upper gear wheel 31;

(III) the right-hand side piston is driven to the left, down its barrel, as the fuel-air mixture burns and escapes via an exhaust outlet, as the upper gear wheel is driven by teeth 11, the mixture in the left-hand side barrel starts to become compressed;

(IV) the left-hand-side mixture is further compressed and its respective connecting rod 41 and crank 44 approaches a top-dead-centre configuration, the geared portion 32 of the upper gear wheel 31 loses its engagement with teeth 11 and the non-geared portion 33 of the lower gear wheel 31 nears its engagement with teeth 12, ignition of the compressed mixture takes place; and (V) the crank mechanism 41, 44 reaches top-dead-centre and the reciprocating member 1 is brought to rest, both gear wheels 31 are disengaged from the teeth 11,12, the crank 44 is started to be rotated anti-clockwise to return reciprocating member 1, ignition of mixture develops into combustion and explosion.

FIGS. 8 to 14 show an alternative reciprocating mechanism 40, which unlike that of FIG. 1 includes no gears. The reciprocating mechanism 40 includes a reciprocating member 1, wherein the geared section of the mechanism shown in FIG. 1 is replaced by shoulders 58 (refer to FIGS. 8 and 13) which connect and couple against parts 57 of a constant breadth follower member 51 (refer to FIGS. 8, 11, 13 and 14). Alternatively (not shown), the reciprocating member 1 may be formed as an integral unit with the constant breadth follower member 51. The linear motion of the reciprocating member 1 is thereby transferred to the constant breadth follower member 51, in which surface bearings 53, supported by further bearings 54 (FIG. 10), are housed. The surface bearings 53 bear against a constant breadth cam 52 which is accordingly rotated by the displaced surface bearings 53, thereby rotating a drive output shaft 59 (not shown in all views) connected to the cam 52. The profile of the cam 52 may be changed to effect a desired change in the speed of the reciprocating member 1/piston 2. The constant breadth follower member 51 may be provided with bearing guides 55 (FIG. 13) which can slide in a bearing mount (not shown). Alternatively, circular bearings 56 may be attached which slide on shafts (FIG. 11).

Desirably, to achieve balance, at least four reciprocating mechanisms 40 are provided (not shown) in an engine, the cams 52 of the two mechanisms in the centre of the arrangement rotating in the same direction, and those on either side of the centre rotating in the opposite direction.

Alternatively, as shown in FIG. 12, a counterbalance pendulum 60 may be connected to the constant breadth follower 51, the pendulum 60 comprising a rod, connected at one of its ends to a surface bearing 53 of the follower member 51, a pivot 62 provided at the other end of the rod, a pivot 61 provided between the two ends of the rod, a shaft 63 connected to the pivot 62, and a mass 64 slidably mounted on the shaft 63. As the mass from 53 moves to the right, so the rod pivots around pivot 61 and pivot 62 moves to the left, thereby causing mass 64 to move along the shaft 63, thus creating a counterbalance (bearings and guides not shown).

An internal combustion engine employing such a reciprocating mechanism 40 may function with two or four stroke engine technology. Referring to FIG. 8 as a starting position, a two stroke embodiment of an engine functions as follows:

(I) combustion and explosion of fuel-air mixture causes the right-hand piston 2 and hence the reciprocating member 1 and follower member 51 to accelerate to the left;

(II) the right-hand surface bearing 53 moves with the follower member 51, thereby bearing against the cam 52 and rotating the cam 52 in an anti-clockwise direction;

(III) the right-hand side piston is driven to the left, down its barrel, as the fuel-air mixture burns and escapes via an exhaust outlet, the mixture in the left-hand side barrel starts to become compressed;

(IV) the left-hand-side mixture is further compressed, as the cam continues to rotate, ignition of the compressed mixture takes place; and (V) ignition of mixture develops into combustion and explosion, the left-hand piston 2 accelerates to the right and hence the linear motion of the reciprocating member 1 and follower member 51 is reversed, thereby causing the left-hand surface bearing 53 to bear against the cam 52 and cause it to continue rotating in an anti-clockwise direction.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A reciprocating mechanism for an engine comprising a reciprocating member, movable in a substantially linear reciprocating direction between two ends of travel, a piston provided on the reciprocating member, and a constant breadth cam and follower, the follower being coupled directly to the reciprocating member to translate linear movement of the reciprocating member into rotary motion of the cam, and the mechanism being such that movement of the reciprocating member at the two ends of its travel is reversed in dependence upon the rotation of the cam, wherein the follower lies to the side of the piston bore and the piston is rigidly mounted to the reciprocating member.

2. A mechanism as claimed in claim 1, wherein the constant breadth cam and follower are coupled to a pendulum counterbalance.

3. An engine including a reciprocating mechanism comprising a reciprocating member, movable in a substantially linear reciprocating direction between two ends of travel, a piston provided on the reciprocating member, and a constant breadth cam and follower, the follower being coupled directly to the reciprocating member to translate linear movement of the reciprocating member into rotary motion of the cam, and the mechanism being such that movement of the reciprocating member at the two ends of its travel is reversed in dependence upon the rotation of the cam, wherein the follower lies to the side of the piston bore and the piston is rigidly mounted to the reciprocating member.

4. An engine as claimed in claim 3, wherein a piston is provided at each end of the reciprocating member.

5. An engine as claimed in claim 3, wherein the constant breadth cam and follower are coupled to a pendulum counterbalance.

6. An engine as claimed in claim 4, wherein the constant breadth cam and follower are coupled to a pendulum counterbalance.

* * * * *